United States Patent
Terradas et al.

(10) Patent No.: US 7,383,927 B2
(45) Date of Patent: Jun. 10, 2008

(54) OPERATING MECHANISM FOR A PARKING BRAKE

(75) Inventors: Jaume Prat Terradas, Barcelona (ES); Jordi V. Jornet, Barcelona (ES); Ismael C. Agramunt, Barcelona (ES); Jesus A. Florez, Barcelona (ES)

(73) Assignee: Fico Cables, S.A., Barcelona (ES)

( * ) Notice: Subject to any disclaimer, the term of this patent is extended or adjusted under 35 U.S.C. 154(b) by 170 days.

(21) Appl. No.: 10/507,653

(22) PCT Filed: Mar. 25, 2003

(86) PCT No.: PCT/EP03/03090

§ 371 (c)(1),
(2), (4) Date: Aug. 22, 2005

(87) PCT Pub. No.: WO03/080411

PCT Pub. Date: Oct. 2, 2003

(65) Prior Publication Data

US 2006/0021829 A1 Feb. 2, 2006

(30) Foreign Application Priority Data

Mar. 25, 2002 (DE) .............................. 102 13 249

(51) Int. Cl.
*F16D 65/14* (2006.01)
(52) U.S. Cl. .................. 188/162; 188/265; 188/2 D
(58) Field of Classification Search ................ 188/2 D, 188/265, 162, 156
See application file for complete search history.

(56) References Cited

U.S. PATENT DOCUMENTS 4,865,165 A * 9/1989 Taig .......................... 188/156
5,590,744 A * 1/1997 Belmond .................... 188/265
6,213,259 B1 * 4/2001 Hanson et al. ............. 188/156

(Continued)

FOREIGN PATENT DOCUMENTS

DE          19653541          6/1998

(Continued)

OTHER PUBLICATIONS

International Search Report for International Patent Application No. PCT/EP03/03090, dated Sep. 17, 2003, 7 pages.

(Continued)

*Primary Examiner*—Bradley T King
(74) *Attorney, Agent, or Firm*—Marshall, Gerstein & Borun LLP

(57) ABSTRACT

An operating mechanism (1) for a parking brake, particularly for motor vehicles, arranged in a housing (60) comprising a threaded rod (20) driven by a motor (10) having a first brake cable fixing (30) guided on said threaded rod (20) for the transformation of said rotation of said motor (10) in a linear movement of said first brake cable fixing (30); and a second brake cable fixing (40) in axial arrangement with said first brake cable fixing (30) and said motor (10) for executing a relative movement of said first (30) and said second brake cable fixing (40) to each other whereby said first (30) and said second brake cable fixing (40) can carry out a common relative movement with respect to the housing (60) for a uniform load distribution to the connected brake cables (70).

3 Claims, 2 Drawing Sheets

U.S. PATENT DOCUMENTS

Figure 1:
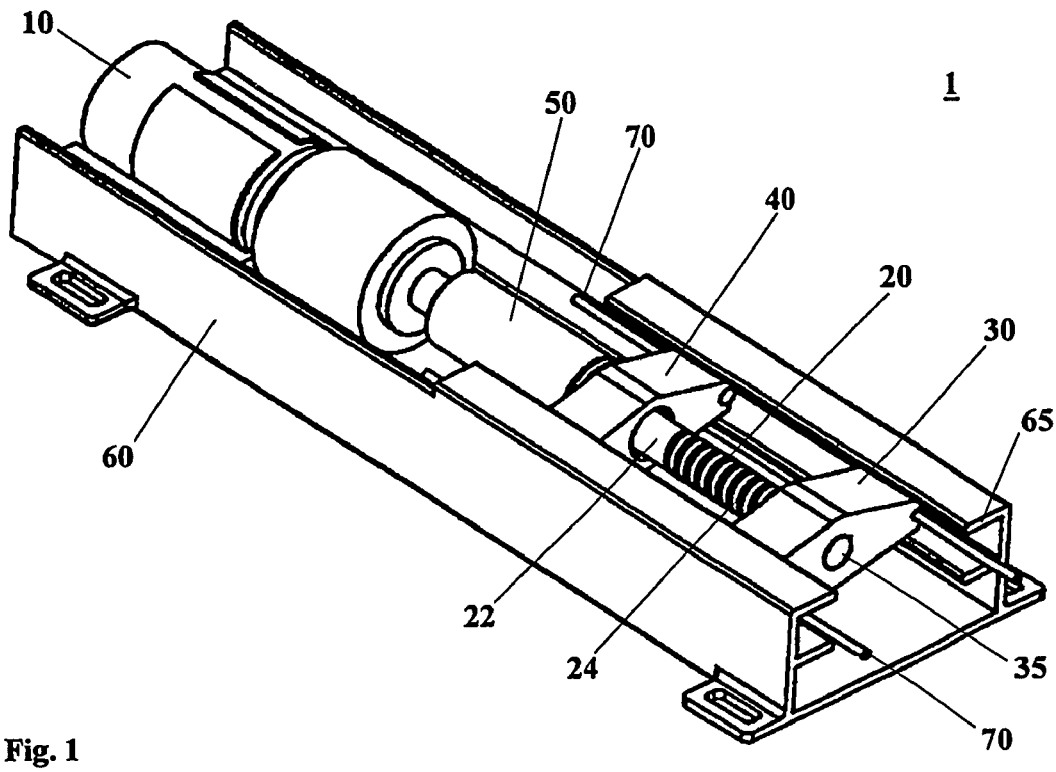

| | | | |
|---|---|---|---|
| 6,244,394 B1 * | 6/2001 | Gutierrez et al. | 188/72.8 |
| 6,533,082 B2 * | 3/2003 | Gill et al. | 188/156 |
| 6,655,507 B2 * | 12/2003 | Miyakawa et al. | 188/171 |
| 6,997,289 B2 * | 2/2006 | Iwagawa et al. | 188/2 D |

FOREIGN PATENT DOCUMENTS

| | | |
|---|---|---|
| DE | 19755933 | 8/1999 |
| DE | 10043739 | 3/2002 |
| EP | 0710595 | 5/1996 |
| FR | 2812056 | 1/2002 |
| WO | WO 98/56633 | 12/1998 |
| WO | WO 02/18188 | 3/2002 |

OTHER PUBLICATIONS

International Preliminary Examination Report for International Patent Application No. PCT/EP03/03090, dated Aug. 6, 2004, 10 pages.

* cited by examiner

OPERATING MECHANISM FOR A PARKING BRAKE

CROSS-REFERENCE TO RELATED APPLICATION

This is the U.S. National Phase of International Application No. PCT/EP 03/03090 filed 25 Mar. 2003, the entire disclosure of which is incorporated herein by reference.

TECHNICAL FIELD OF THE INVENTION

The present invention relates to an operating mechanism for a parking brake, particularly for a parking brake in motor vehicles.

PRIOR ART

Different operating mechanisms for parking brakes are known in the prior art. The simplest technical solution consists of a lever mechanism arranged in the vehicle compartment. This lever mechanism is for example manually operated by the driver so that the brake cables leading to the brakes are tightened or released. In this manner, the connected brakes are operated. Mostly, this operating mechanism is connected to a further downstream lever mechanism which uniformly distributes the applied mechanical loads to the connected brake cables and brakes.

Further operating mechanisms for parking brakes comprise a drive by means of which via an actuator the connected brake cables are operated. For example an electric motor connected via a set of gears with a spindle is such a drive. At least one brake cable is operated via the rotation of the electric motor which is transmitted to a connected spindle. In this manner, the connected brakes are mechanically and in a comfortable way for the driver operated. It is sufficient to press a corresponding button in order to initiate the tightening and releasing of the brakes via the motor.

WO 98/56633 discloses an operating mechanism for one brake cable including an electric motor, a set of gears and a driven spindle with load sensor. By means of this arrangement, only one brake cable can be operated so that an assembly for a uniform force distribution to all connected brakes has to be arranged downstream said operating mechanism. The downstream assembly for the force distribution requires on the one hand high manufacturing efforts and on the other hand high maintenance efforts.

Further operating mechanisms for parking brakes are known from EP-A-0 710 595, DE 197 55 933 and the German patent application 100 43 739.7. By means of these operating mechanisms, at least two connected brake cables are operated. Furthermore, the respective operating mechanism is constructed in such a way that the generated mechanical loads are uniformly distributed to the connected brakes. Based on this reason, no further mechanical assembly for the distribution of mechanical loads is necessary which has to be arranged downstream of the respective operating mechanism.

The operating mechanism for parking brakes disclosed in the above mentioned documents comprise an electric motor which drives an actuator via a set of gears. This actuator varies its length dependent on the fed rotation in order to displace in this way the connected brake cables. Since the actuator is actually displaceably arranged, the generated mechanical loads are uniformly distributed to the brake cables connected to the ends of the actuator. The actuator as well as its drive consists of multi part expensive constructions.

The German patent application 100 43 739.7 comprises an actuator made of a hollow cylinder with longitudinal grooves and an inner nut as well as a spindle guided in said nut. At the ends of the actuator, i.e. at one end of the hollow cylinder and said spindle, respectively, the brake cables are mounted. In case a rotation is transmitted to the hollow cylinder with nut, said spindle is screwed in or out of said hollow cylinder via said nut. Thereby, the actuator is elongated or shortened dependent of the transmitted rotation. The actuator is guided in a concentric opening of a gear which realizes via a positive connection the transmission of the rotation and, at the same time, guarantees an axial displacement of the actuator. The rotation of the electric motor is transmitted to the actuator via a constructively expensive set of gears. The plurality of the parts necessary therefore occupy a lot of space, have a high weight and require efforts in manufacturing and maintenance. Furthermore, said actuator consists of a multi part construction with low tolerances which also require high efforts in manufacturing and maintenance. Additionally, said actuator construction is only operable by means of a set of gears and a special gear rim.

Based on the above mentioned disadvantages of the prior art, it is therefore the technical problem of the present invention to provide an operating mechanism for a parking brake which is qualified by its simple construction, its space saving arrangement as well as its low efforts in maintenance compared to the prior art.

SUMMARY OF THE INVENTION

The above problem is solved by an operating mechanism for a parking brake, particularly for motor vehicles, which is arranged in a housing. This operating mechanism comprises a threaded rod driven by a motor having a first brake cable fixing guided on said threaded rod for the transformation of the rotation of said motor in a linear movement of said brake cable fixing and a second brake cable fixing in axial arrangement with said first brake cable fixing and said motor for performing a relative movement of said first and said second brake cable fixing to each other wherein said first and said second brake cable fixing can execute a common relative movement in view of said housing for a uniform load distribution to the connected brake cables.

The operating mechanism for a parking brake provided by the present invention is qualified by its constructive simplicity which is obvious by means of the limited number of single components. In the present invention, a motor drives a threaded rod without using a set of gears. On the thread of said threaded rod, a brake cable fixing is guided which is screwed on said threaded rod or from said threaded rod by means of a rotation of said motor. In this manner, a rotation of said motor is transformed in a linear movement of the brake cable fixing and, thus, the brake cables. Furthermore, a space saving arrangement of said operating mechanism follows since the first and the second brake cable fixing as well as the motor are positioned in an axial arrangement. In case of a transmitted rotation, both brake cable fixings carry out a relative movement to each other whereby a mechanical loading is transmitted to the brake cables or the same are released. The first and the second brake cable fixing are linear or curve linear displaceably arranged so that they can carry out a common relative movement with respect to the housing. In this manner, the mechanical loads generated by the operating mechanism are uniformly distributed to the connected brake cables. The above arrangement provides besides a space saving operating mechanism for a parking brake a lighter construction compared to the prior art as well as an arrangement requiring lower manufacturing and maintenance efforts.

According to a preferred embodiment of the present invention, the first and the second brake cable fixing are arranged on said threaded rod in order to carry out a common relative movement with respect to said motor.

In the arrangement of both brake cable fixings on the threaded rod, the first brake cable fixing is displaceably guided on the thread of said threaded rod. The second brake cable fixing is not directly displaced by means of the rotation. This arrangement comprising three parts guarantees a simple displacement of the brake cables as well as a simply producible mechanism requiring low maintenance efforts. The threaded rod with said two brake cable fixings is axially displaceably arranged in spite of the rotation transmission for the motor to said threaded rod. Thereby, mechanical loads are uniformly distributed to the connected brake cables. The connection between said motor and said threaded rod is thus qualified by a rotation transmission while a translational motion in axial direction of said motor in said threaded rod is allowed.

According to a further preferred embodiment of the present invention, said threaded rod is connected to said motor via a coupling element and it is axially displaceably arranged in said coupling element.

The coupling element realizes said connection which allows an axial displacement of said threaded rod with brake cable fixing while a rotation of said motor can be transmitted to said threaded rod. Such a coupling element can be realized for example by a hollow cylinder which provides a positive connection between said motor and said threaded rod. Said positive connection is preferably realized by a profiled concentric opening in said hollow cylinder which is suitably formed to the outer shape of the threaded rod.

According to a further preferred embodiment of the present invention, the first and the second brake cable fixing is displaceably guided in track-like recesses of said housing whereby their rotation is prevented. According to this preferred embodiment of the present invention, the motor is rigidly installed in said housing.

In order to screw the brake cable fixing on said threaded rod, said brake cable fixing is preferably according to the invention mounted in track-like recesses of the housing. Thereby, the rotation of the brake cable fixing is prevented. At the same time, the track-like recesses allow a guided displacement of said brake cable fixing in the housing. On this constructive basis, it is preferred according to the invention to screw the brake cable fixing on or from said threaded rod to actuate the connected brake cables. While applying the brakes, said brake cable fixings are thus moved to each other or away from each other within said track-like recesses of said housing, and at the same time said first and said second brake cable fixing together with said threaded rod carry out a relative movement with respect to the rigidly installed motor. Thereby, the loads are uniformly distributed to the connected brake cables.

According to a further preferred embodiment of the present invention, said second brake cable fixing is arranged on said motor so that a common relative movement with said motor and said first brake cable fixing with respect to said housing can be carried out.

Further preferably according to the invention, said motor on which said second brake cable fixing is arranged as well as said threaded rod coupled thereon are displaceably arranged in axial direction of said threaded rod. During a rotation of said threaded rod, thus, said motor with second brake cable fixing is moved in a direction of said first brake cable fixing. In this manner, the brake cables are tightened. By the displaceable arrangement of said motor with second brake cable fixing and said threaded rod with said first brake cable fixing, a uniform load distribution to the connected brake cables is guaranteed. Therefore, the whole assembly comprised of said motor with the second brake cable fixing and the threaded rod with said first brake cable fixing is displaced within the housing of the operating mechanism. Thereby, a space saving and constructively simple assembly of an operating mechanism for a parking brake is provided.

According to a further preferred embodiment of the present invention, the first brake cable fixing and the second brake cable fixing with said motor are displaceably guided in track-like recesses of said housing whereby their rotation is prevented.

In the same manner as described above, the brake cable fixings are guided in track-like recesses of the housing. The track-like recesses allow a displacement of the brake cable fixings while their rotation is prevented. Thereby it is guaranteed that the first brake cable fixing can be screwed on the threaded rod or from said threaded rod. Moreover, a rotation of said brake cable fixings together with said threaded rod or with said motor is prevented. Additionally, the track-like recesses determine the path along which the brake cable fixings move during operating the brakes. This path can be linear as well as curvilinear.

According to a further preferred embodiment of the present invention, said threaded rod is rigidly installed in said coupling element.

By the rigid connection between said threaded rod with said motor via a coupling element, on the one hand the rotation transmission from the motor to the threaded rod and on the other hand the common movement of the motor and the threaded rod relative to the housing is guaranteed. Additionally, this type of coupling element realizes a common compensation movement for load distribution of said motor with second brake cable fixing and said threaded rod with first brake cable fixing.

Preferred according to the invention, at least one brake cable is mounted on said first and said second brake cable fixing.

Dependent on the number of brakes to be actuated, a variable number of brake cables can be connected with said brake cable fixings. Thereby, a simultaneous and uniform controlling of several brakes via several brake cables is realized.

According to a further preferred embodiment of the present invention, the rotation of said motor is not transmitted to said threaded rod via a set of gears.

The transmission of the rotation of said motor by means of the coupling element to said threaded rod realizes a space saving and a weight saving construction of said operating mechanism. Additionally, the present invention shows that a gear assembly related to high production costs and high maintenance efforts is dispensable for an effective operating mechanism of a parking brake.

SHORT DESCRIPTION OF THE DRAWING

Figure 2:
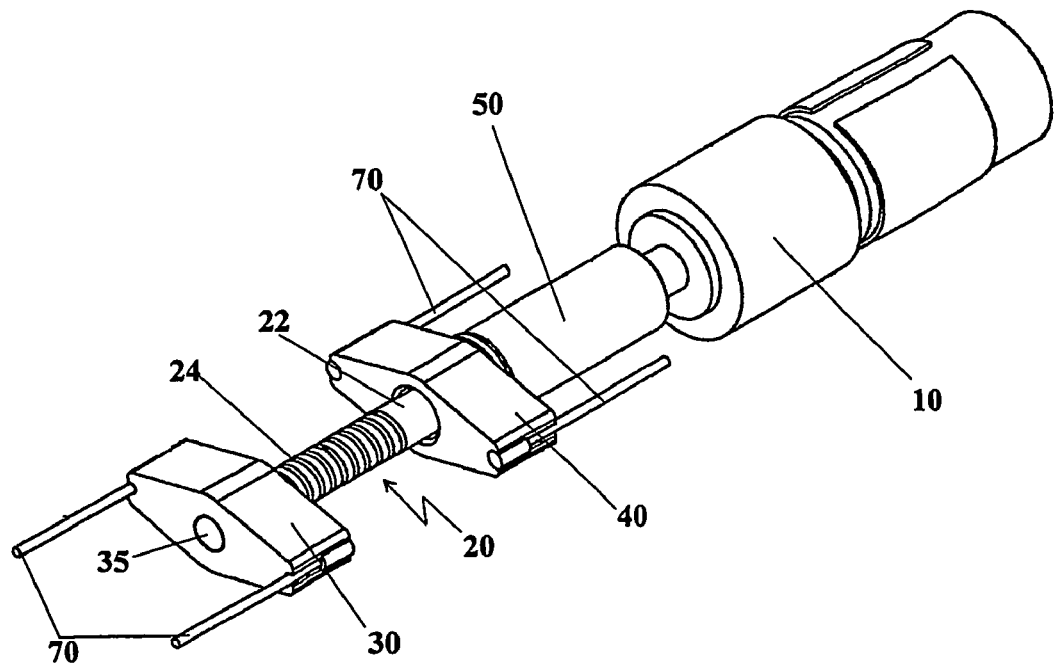
Figure 3:
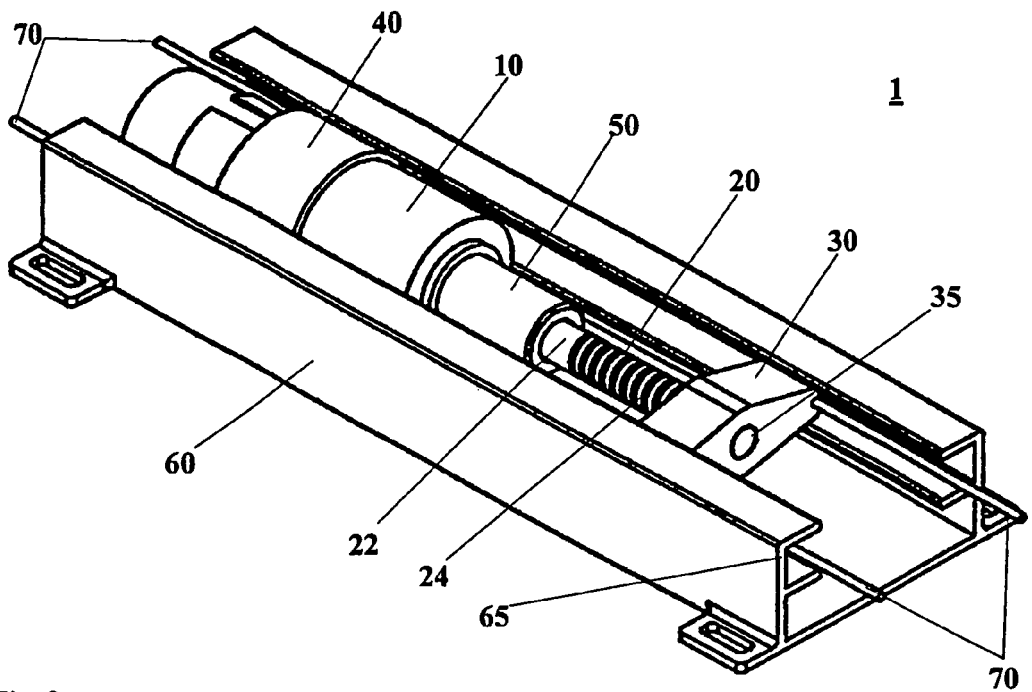
Figure 4:
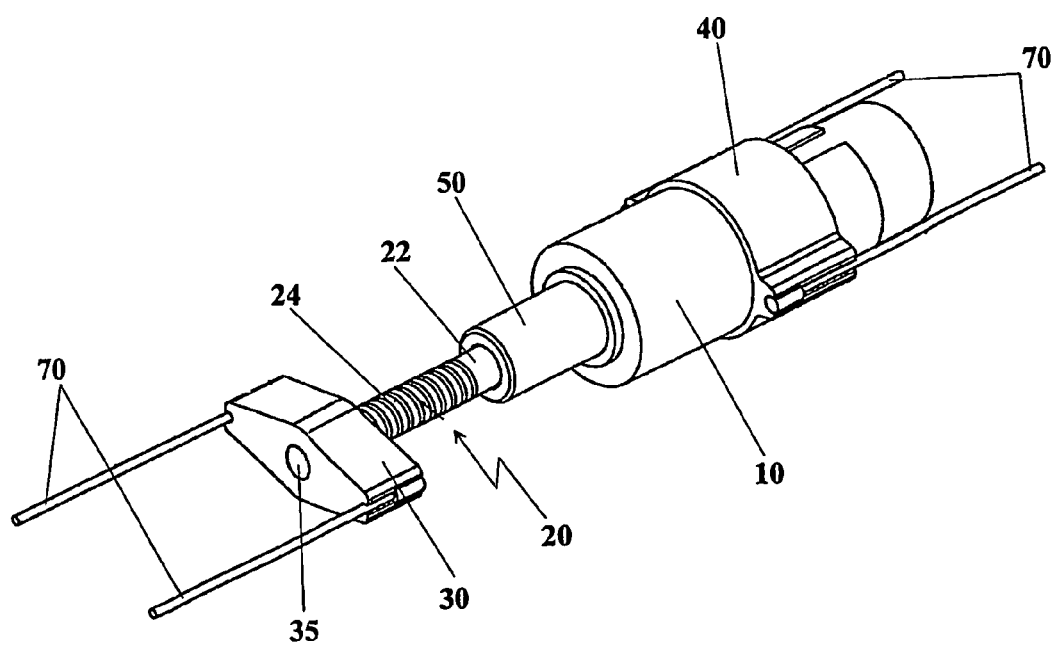

In the following detailed description, presently preferred embodiments of the present invention are described with reference to the drawing. It shows:

FIG. 1 a general view of the operating mechanism according to the invention according to a first preferred embodiment with housing;

FIG. 2 a general view of the operating mechanism according to the invention according to a first preferred embodiment without a housing;

FIG. 3 a general view of the operating mechanism according to the invention according a second preferred embodiment with a housing; and FIG. 4 general view of the operating mechanism according to the invention according to a second preferred embodiment without a housing.

DETAILED DESCRIPTION OF THE INVENTION

A first preferred embodiment of the operating mechanism 1 for a parking brake according to the invention is shown in a perspective general view in FIG. 1. Preferably according to the invention, the operating mechanism 1 is accommodated in a housing 60. Said operating mechanism 1 is comprised of a motor 10 which drives a threaded rod 20. Said motor 10 is preferably according to the invention an electric motor wherein its function can be also carried out by other suitable drives.

Said motor 10 rigidly installed in said housing 60 according to a preferred embodiment of the present invention is preferably according to the invention connected to the threaded rod 20 via a coupling element 50. Said coupling element 50 provides a positive connection between said motor 10 and said threaded rod 20 which realizes a transmission of the motor rotation to the threaded rod 20 and which at the same time allows an axial displacement of said threaded rod 20 in its axial direction within said coupling element 50. The axial displaceability of said threaded rod 20 serves for a uniform distribution of the mechanical loads generated by the operating mechanism 1 to the connected brake cables 70. The coupling element 50 also prevents that said threaded rod 20 is removed out of said coupling element 50 during the operation of the operating mechanism 1. Said threaded rod 20 shows a portion 22 without a thread near the coupling element 50 while the remaining portion 24 of said threaded rod 20 is equipped with a thread.

On said portion 24 with a thread of the threaded rod 20, at first a brake cable fixing 30 is guided having an inner thread in an opening 35 suitably shaped to said threaded rod 20. Based on said suitable threads of said threaded rod 20 and said first brake cable fixing 30, said first brake cable fixing 30 is screwed on or screwed from said threaded rod 20 by the rotation of the threaded rod 20. A complete screw off of said first brake cable fixing 30 from said threaded rod 20 is prevented by a stopper (not shown) which is preferably positioned at the end of the portion 24 with thread.

In the portion 22 without thread, a second brake cable fixing 40 is arranged. Said second brake cable fixing 40 supports at a suitably shaped stopper (not shown) of the threaded rod 20 so that said second brake cable fixing 40 is displaceable not at all or only in the direction of the portion 24 with thread of said threaded rod 20. Furthermore, said second brake cable fixing 40 is arranged in such a way that a rotation of said threaded rod 20 is possible within said second brake cable fixing 40.

At least one brake cable 70 is connected to said first 30 as well as to said second brake cable fixing 40. The mounting position of said brake cable 70 on said brake cable fixings 30, 40 can vary dependent on the shape of the brake cable fixings 30, 40. Preferably according to the invention, one brake cable 70 is centrally connected to the brake cable fixing 30, 40. Also preferably according to the invention, respectively two brake cables 70 are mounted on said brake cable fixing 30, 40. The brake cables 70 which are mounted on the first brake cable fixing 30 and on the second brake cable fixing 40 extend in opposite directions. During shortening of the distance between both brake cable fixings 30, 40, the connected brake cables 70 are loaded by tensile loads. In case the distance between both brake cable fixings 30, 40 is increased, the connect brake cables 70 are released.

Preferably according to the invention, the first 30 and the second brake cable fixing 40 are equally formed in their outer shape. Thereby it is guaranteed that both brake cable fixings 30, 40 can be guided in track-like recesses 65 of the housing 60 (confer FIG. 1). Outer portions of the brake cable fixings 30, 40 engage said track-like recesses 65. In this manner, on the one hand a rotation of the brake cable fixings 30, 40 is prevented and on the other hand the track-like recesses 65 determine a guiding and a path along which the brake cable fixings 30, 40 are displaced dependent on the rotation of the threaded rod 20. The path for the brake cable fixings 30, 40 determined by the track-like recesses 65 are preferably according to the invention linear wherein they can be also curvilinearly shaped. It is also preferred according to the invention to make the track-like recesses 65 from several parts or in different shapes. Correspondingly, the shape of the brake cable fixings 30, 40 would then also vary so that a positive connection can be formed with a respective guiding in the housing 60 of the operating mechanism 1. In this context, the track-like recesses 65 can be replaced by recesses in the bottom of the housing 60 according to a further preferred embodiment of the present invention which are engaged by projections of the brake cable fixings 30, 40. On this basis, the brake cable fixings 30, 40 and the housing 60 could be preferably according to the invention formed in smaller size which leads to an additional weight reduction of the operating mechanism 1 as well as less space requirement during the later installation in a motor vehicle.

FIG. 2 shows an enlarged perspective view of the first preferred embodiment of the present invention without said housing 60. By means of this illustration, the opposite course of the brake cables 70 can be seen, which are connected with said first 30 and said second brake cable fixing 40, respectively. In case a rotation is transmitted to said threaded rod 20 by said motor 10 and said coupling element 50 so that said first brake cable fixing 30 is screwed on the portion 24 with thread of said threaded rod 20, said first 30 and said second brake cable fixing 40 execute a relative movement to each other. During this process, said first brake cable fixing 30 is moved in the direction of said second brake cable fixing 40 while said second brake cable fixing 40 maintains its position with respect to said threaded rod 20 and supports preferably on said threaded rod 20 or said coupling element 50. The distance between said first 30 and said second brake cable fixing 40 decreases whereby the brake cables 70 are loaded by tensile loads.

In order to achieve a uniform load distribution to the connected brake cables 70, said threaded rod 20 is axially displaceably mounted within said coupling element 50. Based on this constructive assembly, said threaded rod 20 is pulled out of said coupling element 50 or pushed into said coupling element 50 dependent on the mechanical loads on said first brake cable fixing 30 and said second brake cable fixing 40 until the mechanical loads respectively applying the brake cable fixings 30, 40 have been equalized. To this end, said coupling element 50 is preferably according to the invention formed as a hollow cylinder comprising a profiled concentric opening. The portion 22 without a thread of said threaded rod 20 is complementary shaped to this profiled concentric opening so that it can be displaced within said coupling element 50 and so that at the same time the rotation of the motor 10 can be transmitted. A suitable stopper at the coupling element 50 and/or on the portion 22 without thread of the threaded rod 20 ensures that said threaded rod 20 cannot be pulled out of the coupling element 50. Based on the axial displaceability of the threaded rod 20 with brake cable fixings 30, 40 within said coupling element 50, thus a relative movement of this assembly is realized with respect to the motor 10 rigidly installed in the housing 60 for a uniform load distribution to the connected brake cables 70.

With reference to FIG. 2, it is good to be seen that a space saving and weight saving construction of an operating mechanism 1 for a parking brake is realized based on the leaving out of a set of gears within the operating mechanism 1 according to the invention. The simple construction of the operating mechanism 1 according to the present invention also requires low production costs as well as low maintenance efforts.

The general view of a further preferred embodiment of the present invention is shown in FIG. 3. Preferably according to the invention, the operating mechanism 1 according to a second preferred embodiment comprises a motor 10 which is connected to the threaded rod 20 via a coupling element 50. Preferably according to the invention, the second brake cable fixing 40 is mounted on said motor 10 which is guided in track-like recesses 65 of said housing 60 of the operating mechanism 1. Said motor 10 is preferably according to the invention in the direction of the threaded rod 20 axially displaceably mounted via said second brake cable fixing 40 on the housing 60.

Two brake cables 70 are also preferably according to the invention mounted on said brake cable fixing 40 which extend in the direction of the motor 10. The motor 10 is rigidly connected with said threaded rod 20 via said coupling element 50. To this end, the portion 22 without a thread of the threaded rod 20 is rigidly mounted in said coupling element 50. Said first brake cable fixing 30 is guided on the portion 24 with thread of the threaded rod 20. In analogy to the above described first preferred embodiment of the present invention, the first brake cable fixing 30 comprises an opening 35 having an inner thread complementary shaped to the thread of the threaded rod 20. Additionally, the constructive and functional features of the single component of the operating mechanism 1 described in connection with the first preferred embodiment of the present invention can be also applied to further preferred embodiments of the present invention as far as the inventive concept of the operating mechanism 1 is not disturbed thereby.

As already described above, the second brake cable fixing 40 with motor 10 is guided in track-like recesses 65 of the housing 60. These track-like recesses 65 also lead the outer portions of the first brake cable fixing 30. They guarantee thereby a guided displacement of the first brake cable fixing 30 in axial direction of the motor 10 and the threaded rod 20. They prevent at the same time a rotation of the first brake cable fixing 30 whereby a screw on or a screw off of the first brake cable fixing 30 on or from the threaded rod 20 is ensured.

FIG. 4 shows a general view of the second preferred embodiment of the present invention without the housing 60. In case the threaded rod 20 is rotated by the motor 10 via the coupling element 50 in such a way that the first brake cable fixing 30 is screwed on the threaded rod 20, the first brake cable fixing 30 and the second brake cable fixing 40 with motor 10 carry out a relative movement to each other. In this manner, the distance between the brake cable fixings 30, 40 decreases whereby the connected brake cables 70 are tightened. In case the motor 10 rotates in the opposite direction as described above, the first brake cable fixing 30 is screwed from said threaded rod 20 whereby the brake cables 70 are released. The loading and unloading of the connected brake cables 70 is thus executed by the displacement of the first brake cable fixing 30 and the second brake cable fixing 40 with motor 10 within the track-like recesses 65 of the housing 60.

In case of a non-uniform mechanical load distribution to the brake cables 70 respectively connected to said first brake cable fixing 30 and to said second brake cable fixing 40 with motor 10, preferably according to the invention the whole assembly comprising motor 10, brake cable fixings 30, 40, coupling element 50 and threaded rod 20 are displaced within the track-like recesses 65 relative to the housing 60 of said inventive operating mechanism 1 of a parking brake. Thereby, the mechanical loads are uniformly distributed to the connected brake cables 70 whereby also a uniform operation of the connected brakes is ensured.

Also in the further described preferred embodiment of the present invention, an operating mechanism 1 for a parking brake is provided in a constructive simple manner which can be operated without using a set of gears. Thereby, on the one hand the production cost and the space requirement of the operating mechanism are reduced and on the other hand lower efforts in maintenance are generated during the later use of the operating mechanism 1.

LIST OF REFERENCE SIGNS

1 operating mechanism for a parking brake
10 motor
20 threaded rod
22 portion of the threaded rod without thread
24 portion of the threaded rod with thread
30 first brake cable fixing
35 opening with inner thread in the first brake cable fixing 30
40 second brake cable fixing
50 coupling element
60 housing
65 track-like recesses in the housing 60
70 brake cable

The invention claimed is:

1. An operating mechanism for a parking brake having brake cables and arranged in a housing, the operating mechanism comprising:
    a motor rigidly installed in the housing;
    a threaded rod;
    a coupling element connecting the threaded rod to the motor, wherein the threaded rod is axially displaceably arranged in the coupling element;
    a first brake cable fixing guided on the threaded rod and adapted to transform rotation of the motor to a linear movement of the first brake cable fixing;
    a second brake cable fixing arranged axially with the first brake cable fixing, wherein rotation of the motor causes relative movement of the first brake cable fixing with respect to the second brake cable fixing;
    wherein the first brake cable fixing and the second brake cable fixing are adapted to carry out a common movement relative to the housing, thereby to uniformly distribute a load to the brake cables connected thereto;
    wherein the first brake cable fixing and the second brake cable fixing are arranged on the threaded rod and adapted to execute a common movement relative to the motor; and wherein the coupling element provides a direct positive connection between the motor and the threaded rod, such that the first brake cable fixing, the second brake cable fixing, the threaded rod, the coupling element, and the motor are positioned along a common axis.

2. The operating mechanism of claim 1, in which the housing includes track recesses and in which the first and second brake cable fixings are linearly displaceably guided by the housing track recesses, thereby to prevent rotation of the first and second brake cable fixings.

3. The operating mechanism of claim 1, in which at least one brake cable is mounted on the first and second brake cable fixings, respectively.

* * * * *